(12) United States Patent
Morris

(10) Patent No.: US 8,471,724 B2
(45) Date of Patent: Jun. 25, 2013

(54) PROGRAMMING OF A DEMAND TRIGGERED SERVICE DISCONNECT DEVICE FROM A THRESHOLD IN AMPS

(75) Inventor: Richard L. Morris, Lafayette, IN (US)

(73) Assignee: Landis+Gyr Inc., Lafayette, IN (US)

( * ) Notice: Subject to any disclaimer, the term of this patent is extended or adjusted under 35 U.S.C. 154(b) by 1013 days.

(21) Appl. No.: 12/483,882

(22) Filed: Jun. 12, 2009

(65) Prior Publication Data
US 2010/0007522 A1    Jan. 14, 2010

Related U.S. Application Data

(60) Provisional application No. 61/131,777, filed on Jun. 12, 2008.

(51) Int. Cl.
| | |
|---|---|
| G05B 21/00 | (2006.01) |
| G05B 13/00 | (2006.01) |
| G05B 15/00 | (2006.01) |
| G08B 23/00 | (2006.01) |
| G08C 15/06 | (2006.01) |
| G08C 19/16 | (2006.01) |
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| G01M 1/38 | (2006.01) |

(52) U.S. Cl.
USPC .......... 340/870.02; 340/870.01; 700/276; 700/295

(58) Field of Classification Search
USPC .......... 700/22, 266, 90, 275, 286, 295, 276; 340/870.01, 870.02, 870.07
See application file for complete search history.

(56) References Cited

U.S. PATENT DOCUMENTS

| | | | | |
|---|---|---|---|---|
| 4,771,185 A | * | 9/1988 | Feron et al. | 307/39 |
| 2006/0221521 A1 | * | 10/2006 | Veroni | 361/78 |

* cited by examiner

*Primary Examiner* — Hai Phan
*Assistant Examiner* — Franklin Balseca
(74) *Attorney, Agent, or Firm* — Maginot, Moore & Beck LLP

(57) ABSTRACT

A first embodiment is an arrangement, such as a meter programming device, that includes a memory, a user interface, a communication interface, and a processing circuit. The user interface arrangement is configured to receive user input. The communication interface is configured to communicate with a corresponding communication interface on a utility meter. The processing circuit is configured by software stored in the memory to: receive a user input at the user interface identifying a disconnect threshold as a measure of current; generate a disconnect threshold value as a function of the user input and a service voltage; and provide the disconnect threshold value to the utility meter via the communication interface.

15 Claims, 2 Drawing Sheets

PROGRAMMING OF A DEMAND TRIGGERED SERVICE DISCONNECT DEVICE FROM A THRESHOLD IN AMPS

This application claims the benefit of U.S. Provisional Patent Application Ser. No. 61/131,777, filed Jun. 12, 2008, which is incorporated herein by reference.

FIELD OF THE INVENTION

The present invention relates to utility meters, and more particularly, programming utility meters using an external device.

BACKGROUND OF THE INVENTION

Electricity meters typically connect to a junction between utility power lines and a load. For example, an electricity meter is often connected at the point at which the electrical system of a residence connects to the utility power line. The meter may thereby perform measurements regarding the energy consumed by residence for billing and other purposes. Similarly, electricity meters are often connected at the point at which the electrical system of a business or other non-residential consumer connects to the utility power line, again for billing and other purposes.

Different consumers employ electricity for different purposes. As result various types of electrical service are available to suit the needs of the consumer. For example, most residences employ basic consumer electrical devices and only require a single-phase electrical service. Larger facilities and/or facilities, however, can include multiphase electrical devices or high power equipment, and therefore require one of several types of polyphase or multiphase electrical service. Examples of known service types include four-wire wye, four-wire delta and three-wire wye services. These types of electrical service require different electricity meters that are suited to perform polyphase electrical energy consumption measurements.

Electricity meters, both single phase and polyphase, sometimes include disconnect switches that can be controlled to disconnect and reconnect a load to the utility power lines. Disconnect switches can be used to implement prepaid electricity services in residential meters. Disconnect switches may also be employed for load shedding in residential and larger polyphase systems. In a prepaid service, the disconnect switch automatically disconnects the load from the power lines once the customer has consumed the prepaid amount of energy. The customer may then purchase more prepaid services to have the power reconnected via the disconnect switch. In load shedding, one or more phases of a polyphase system may be disconnected to reduce consumption by a particular facility. Other implementations of electricity disconnect switches are known.

In one type of load shedding application, a meter disconnect switch arrangement is programmed to disconnect the load from the power lines when the energy consumption for one or more finite periods of time exceeds a predetermined threshold. Such a threshold is known in the art as a demand threshold. The demand threshold represents a limit of average power that can be consumed over a period of time. The period of time is a predetermined interval of between 1 and 60 minutes. If the energy consumption measurements within the meter indicate that the average power exceeds the demand threshold for the defined time period, then the disconnect switch arrangement disconnects the at least one phase of electrical power from the load. This demand threshold feature allows a customer to limit its power consumption when the power consumption begins to get too high. Such an arrangement can result in significant cost savings because energy price rates often increase as a function of consumption.

Accordingly, many meters with disconnect switch arrangements are configured to disconnect the customer load from the power line when the demand threshold is exceed for any one of an ongoing sequence of time periods. In general, meters having this feature may be programmed by external devices, such as portable computing devices, that communicate with the meter circuitry via an optical port on the meter.

An additional feature that has become increasingly important is the potential use of a disconnect switch arrangement for fusing purposes. In particular, there is an interest to use the disconnect switch to disconnect utility power if the power provided to a load is exceedingly high, thereby resulting in a possible safety concern due to potential overload. The fusing application typically operates in the same manner as the load shedding/demand limiting application except the threshold typically represents an instantaneous power/energy measurement, as opposed to an average or cumulative measurement over a demand period.

One difference between fusing applications and the load shedding/demand limiting applications discussed further above is that customers intuitive associate fusing/safety applications with current limits, as opposed to energy or power limits. Accordingly, there is a need for a disconnect switch application that can controllably disconnect power to a load based on load current, as opposed to energy demand or average power consumption.

A known method of addressing this need is to employ a measurement circuit within the meter to perform current measurements, and then compare the current measurements to a threshold. Control circuitry within the meter may then cause the disconnect switch to disconnect the load from the power lines if the current exceeds the defined current threshold.

While adding the firmware and circuits configured to perform such current analysis would provide current-based disconnect, such additional firmware and operations further complicate utility meters. Moreover, such additional firmware and operations are difficult to implement in meters that have already been installed. Accordingly, there is a need for a method to test for current limits in a meter that does not require new or different dedicated meter firmware.

SUMMARY OF THE INVENTION

Embodiments of the present invention address the above needs, as well as others, by providing a meter programming device that allows the user to define a current threshold, but programs the meter to have an energy demand threshold that corresponds to the current threshold. As a result, existing meters that are not configured for current testing and/or current-based disconnect operations may nevertheless achieve the desired current-based disconnect functionality. In new meters, the need for separate demand threshold testing and current threshold testing arrangements can be avoided.

A first embodiment is an arrangement, such as a meter programming device, that includes a memory, a user interface, a communication interface, and a processing circuit. The user interface arrangement is configured to receive user input. The communication interface is configured to communicate with a corresponding communication interface on a utility meter. The processing circuit is configured by software stored in the memory to: receive a user input at the user interface identifying a disconnect threshold as a measure of current; generate a disconnect threshold value as a function of the user input and a service voltage; and provide the disconnect threshold value to the utility meter via the communication interface.

The above described features and embodiments, as well as others, will become more readily apparent to those of ordinary skill in the art by reference to the following detailed description and accompanying drawings.

DETAILED DESCRIPTION

Figure 1:
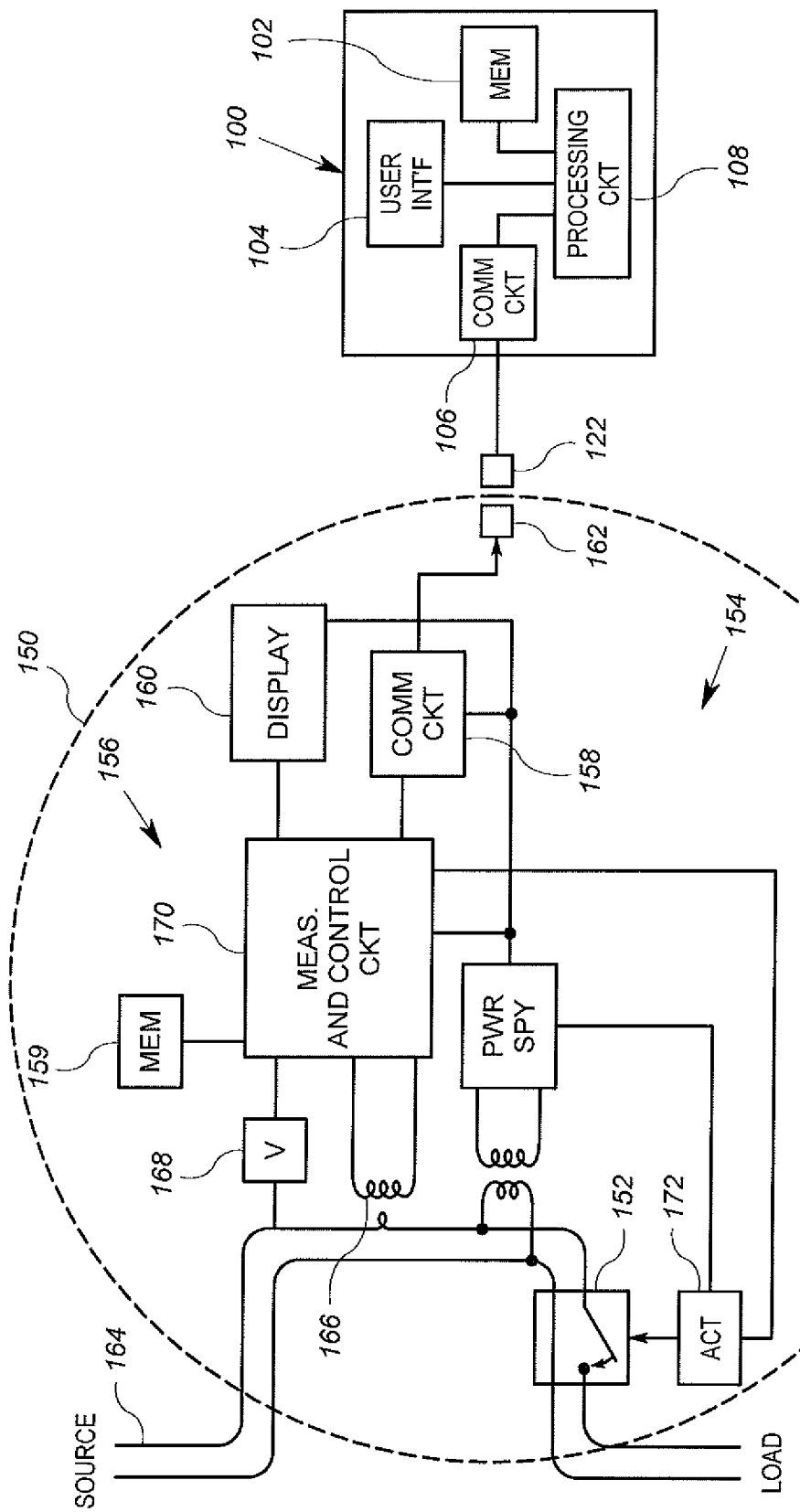
FIG. 1 shows a meter and an arrangement according to an exemplary embodiment of the invention.

FIG. 1 shows a first embodiment of a meter programming arrangement 100 according to the invention that includes a memory 102, a user interface 104, a communication interface 106, and a processing circuit 108. The arrangement 100 is shown in FIG. 1 coupled to an exemplary electricity meter 150 that includes a disconnect switch 152, demand threshold switch control circuitry 154, measurement circuitry 156, a communication circuit 158, a memory 159, and a display 160.

The arrangement 100 may suitably be arranged in portable computing device such as a laptop computer, or a portable meter programming device such as the 1132 COM meter programmer available from Landis+Gyr, Inc. of Lafayette, Ind. Such devices have the suitable processing circuits, memories, communication circuits and user interfaces that may be readily configured in the novel manner described herein to carry out the operations of the arrangement 100.

In this embodiment, the memory 102 is one or more memory devices that store programming instructions and/or program data used by the processing circuit 108. The memory 102 preferably also stores user inputs received via the user interface 104. Memories suitable for software and program data storage in computing devices are well-known in the art.

The user interface 104 is a device configured to, among other things, receive input from a human operator. The user interface 104 also preferably displays information to the operator. To this end, in an exemplary embodiment, the user interface 104 includes a display and user input devices, not shown. The display may suitable be an LCD display or other commonly available graphical and/or alphanumeric display device employed in portable computing devices. The user input devices may include an alphanumeric keypad or keyboard, one or more pointing devices, and/or a touch-screen display.

The communication interface 106 may be any typical circuit that includes a physical communication port through which the processing circuit 108 effectuates communications with external devices. For example, the communication interface 106 may suitably include an RS-232 port, a USB port, a firewire port, or the like. In this embodiment, the communication interface 106 is configured to communicate with a corresponding communication interface on a utility meter, such as the communication circuit 158 of the meter 150 of FIG. 1.

In this embodiment, the communication interface 106 and the communication circuit 158 are configured to be communicatively interconnected via optical transceivers 122, 162. The optical transceiver 162 is disposed within the meter 150, and the optical transceiver 122 is connected to the communication interface 106. The optical transceiver 122 may suitably be an optical probe device that converts between electrical signals employed by the communication circuit 106 and optical signals. Such probes, which are used to communicate with optical ports of electricity meters, are known in the art.

The processing circuit 108 may suitably be a microprocessor-based circuit that performs operations based on programming instructions (software) stored in the memory 102. In this embodiment, the processing circuit 108 is configured to receive a user input via the user interface 104 that identifies a disconnect threshold as a measure of current. In one embodiment, the threshold defines the number of amps (or other measure of current) above which the disconnect switch 152 of the meter 150 should be opened. For example, the user may enter 40 amperes as a threshold for the disconnect switch 152. In this case, the user intends for the switch 152 to open responsive to a condition in which the current flowing to the load (through the meter 150) is approximately 40 amperes or higher.

In any event, the processing circuit 108 is further configured to generate a disconnect threshold value as a function of the user input and a service voltage. In many embodiments, the processing circuit 108 generates the disconnect threshold value as an energy or power value that corresponds to the input current threshold and the line voltage of the electrical service provided to the load. For example, in one embodiment, the processing circuit 108 performs the following calculation to determine the disconnect threshold value E in a single phase electrical system (i.e. residential):

$$E = A_T * V_S$$

where $A_T$ is the threshold value in units of current, representative of the user input, $V_T$ is the service voltage. The processing circuit 108 may suitably further calculate the value E in a polyphase electrical system using the following calculation:

$$E = (\sqrt{3}) * A_T * V_S$$

The service voltage $V_S$ for single phase electrical service is typically 240 Vrms, while the service voltage for polyphase electrical service may suitably be 120 Vrms, 240 Vrms, 208 Vrms or 360 Vrms.

In one embodiment, the processing circuit 108 is configured to obtain the service voltage amount from another user input. In other embodiments, the processing circuit 108 may be configured to obtain the service voltage information from another means, such as by querying the meter 150 itself via the communication interface 106.

In any event, the processing circuit 108 is further configured to provide the calculated disconnect threshold value to the utility meter 150 via the communication interface 106.

Referring now to the meter 150, as discussed above, the meter 150 includes a disconnect switch 152, demand threshold switch control circuitry 154, measurement circuitry 156, a communication circuit 158, a memory 159, and a display 160. In general, the meter 150 may constitute any of a number of available "solid state" electricity meters that measure or meter electricity delivered from a source (i.e. utility power lines) to a load (electric system of a customer). As is known in the art, the meter 150 is operably coupled to the power lines 164 to measure the electricity delivered to the load.

The disconnect switch 152 is a relay device or other controllable, reversible switch that is employed in meters to make or break a connection in the power lines 164, thereby connecting or disconnecting the load from the source. The demand threshold control circuitry 154 is operably coupled to control the state of the disconnect switch 152 between an open and closed state. In many implementations, the demand threshold control circuitry 154 is further operably coupled to place the disconnect switch 152 in an armed state, which is not connected. In such a case, the reconnection of the switch 152 is completed via a manual switch, not shown, on the exterior of the meter 150.

In any event, to accomplish the foregoing, the demand threshold control circuitry 154 is a circuit that is configured to obtain a measure the energy consumption (or average power consumption) of the load (i.e. passing through the meter 150) either instantaneously or for a defined period, typically between one and sixty minutes. The demand threshold control circuit 154 is further configured to determine if the energy consumption (or average power consumption) for the time period exceeds a predetermined threshold. If so, then the demand threshold control circuitry 154 causes the disconnect switch 152 to be in the open state, thereby breaking the connection in the power lines 164 between the source and the load. If not, then the demand control circuit 154 causes the disconnect switch 152 to remain in the closed state, thereby maintaining the electrical connection between the source and the load. Such arrangements are known and may take many forms.

In any event, the demand threshold control circuitry 154 includes an actuator 172 and at least a portion of the meter's measurement and control circuit 170, discussed further below. The actuator 172 is a device that is configured to cause the disconnect switch 152 to change states responsive to control signals from the measurement and control circuit 170.

The measurement circuitry 156 is the portion of the meter that actually measures the energy consumption by the load. Such circuits are known. In this embodiment, the measurement circuitry 156 includes a current transformer 166, a voltage measurement circuit 168, and the measurement and control (MC) circuit 170. Thus, it will be appreciated that the MC circuit 170, or portions thereof, form a part of the measurement circuitry 156 and the demand threshold control circuitry 154.

Referring specifically to the measurement circuitry 156, the current transformer 166 and the voltage measurement circuit 168 are operably coupled to provide, respectively, current and voltage measurement signals to the MC circuit 170. Such current and voltage measurement signals represent scaled-down versions of the actual voltage and current waveforms on the power lines 164. The MC circuit 170 is configured to generate energy consumption measurements from the current and voltage measurement signals. To this end, the MC circuit 170 may include A/D conversion circuitry, not shown, and digital signal processing circuitry, not shown, but which is capable of generating energy consumption signals from digital current and voltage measurement signals. Such circuits are well-known in the art.

The MC circuit 170 also typically includes one or more processing devices that are configured to control the overall operation of the meter circuits, including the display 160, the communication circuit 158, and the actuator circuit 172. In some cases, a single processor device performs the digital signal processing and the control functions. In other cases, multiple processors contribute to the digital signal processing and/or the control functions. Various combinations are known in the art.

In normal ongoing operation, the disconnect switch 152 is normally closed, allowing electrical power to flow from the source to the load on the power lines 164. The meter 150 measures electrical energy consumption by the load using the measurement circuitry 156. The MC circuit 170 may suitably cause the display 160 to display energy consumption information as well as store the energy consumption information in local memory not shown.

In addition, the MC circuit 170 tracks energy consumption (or average power consumption) over consecutive so-called demand periods. A demand period is one of a set of consecutive time windows in which average power demand is tracked. The demand period duration may be set by the user (i.e. the utility), and is typically in the range of one minute to sixty minutes in length.

The MC circuit 170 further determines if the average power consumption for the most recently completed demand period exceeds a stored energy demand threshold. If so, then the MC circuit 170 provides a signal to the actuator 172 that causes the actuator 172 to open the disconnect switch 152. If not, then the MC circuit 170 continues with normal metering operations and the disconnect switch 152 remains closed.

According to an embodiment of the present invention, the meter 150 has stored the energy demand threshold in the memory 159 as a result of previous programming by the arrangement 100. In an embodiment of the invention, the arrangement 100 allows a user to identify a current threshold that is subsequently converted to a corresponding energy demand threshold. The energy demand threshold is compatible with the demand threshold control circuitry 154 of the meter 150, while the user defined current threshold is not. The arrangement 100 then programs the meter 150 to store the energy demand threshold. As a result of this programming, the demand threshold control circuitry 154 will cause the switch 152 responsive to the current being approximately equal to or greater than the user defined threshold, even though the demand threshold control circuitry 154 is in fact using an energy demand threshold.

Alternatively, if the user desires to program the meter 150 with an energy demand threshold, then the arrangement 100 can be configured to do so without converting the input data, except as necessary to facilitate the communication of data and/or accommodate scaling considerations.

Figure 2:
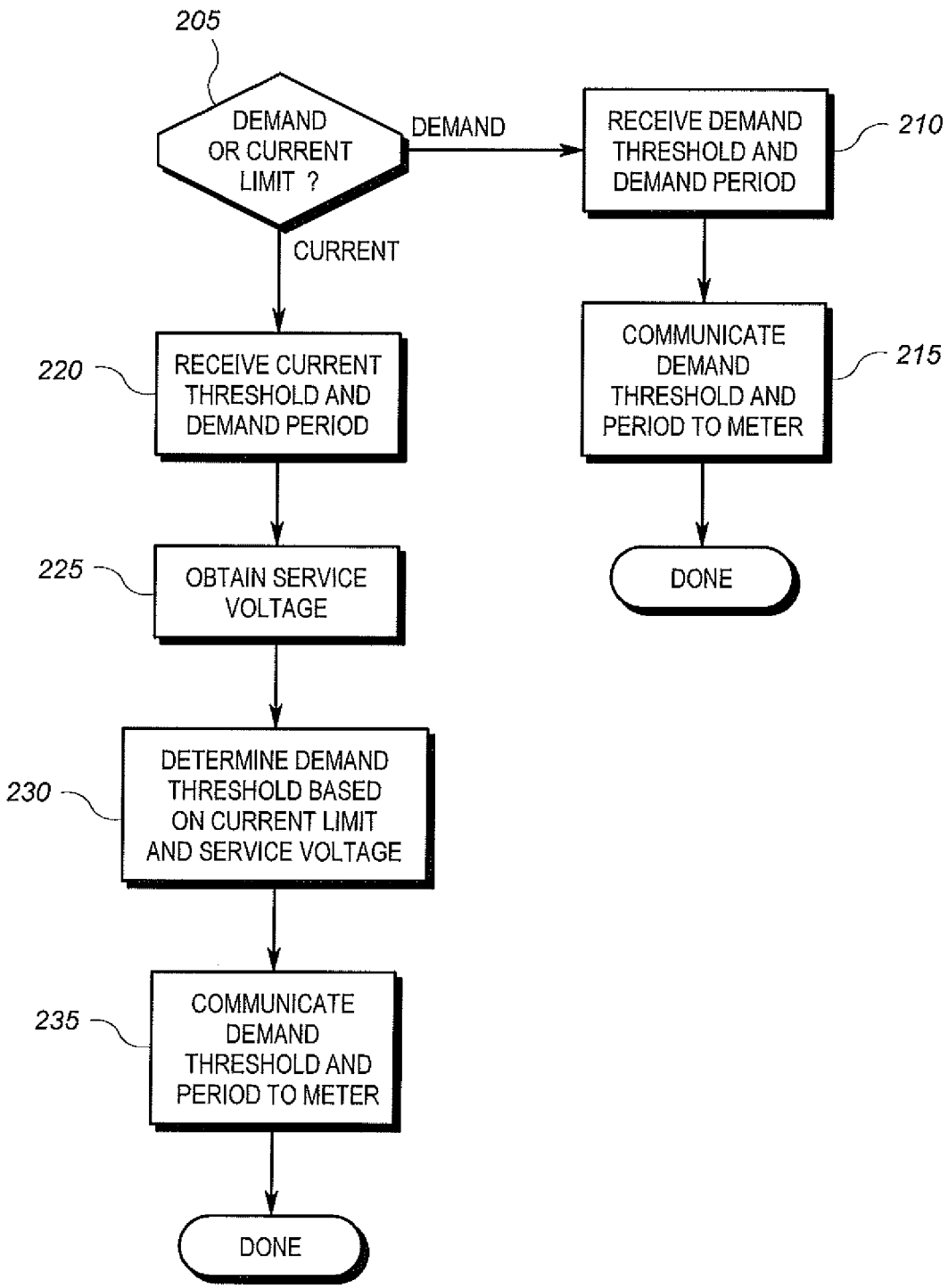
FIG. 2 shows a flow diagram of steps that may be carried out by a processing circuit of the arrangement of FIG. 1.

FIG. 2 shows the operations of the processing circuit 108 that may be used to program a meter such as the meter 150 of FIG. 1 having a demand threshold control circuitry 154. Programming of a meter may occur in the field, or during manufacturing or testing of the meter. To facilitate programming the meter 150, the arrangement 100 must first be operably coupled to the meter 150.

To this end, prior to the execution of the steps of FIG. 2, the transceivers 122 and 162 are temporarily placed in physical proximity allowing for optical signaling therebetween. After this placement, the processing circuit 108 thereafter communicates with the MC circuit 170 via the optical transceivers 122, 162, the communication interface 106, and the communication circuit 158. After initial handshaking operations between the processing circuit 108 and the MC circuit 170, the steps of FIG. 2 may be carried out by the processing circuit 108. However, it will be noted that a number of steps of FIG. 2 may be carried out prior to connection, with only the transfer of data performed after connection.

In any event, in step 205, the processing circuit 108 receives from the user interface 104 a user selection as to whether to enter a demand threshold or a current limit. The selection may be as a result of a displayed prompt, or may result from a menu selection or other dialog mechanism. If the user selects to enter a demand threshold, then the processing circuit 108 proceeds to step 210. If, however, the user selects to enter a current limit threshold, then the processing circuit 106 proceeds to step 220.

In step 210, the processing circuit 108 prompts for, and receives input identifying an energy demand threshold, and may further receive an input identifying the duration of the demand periods. For example, the input may indicate that the energy demand threshold is to be average of 10 kW for each demand period, wherein the demand periods are thirty minutes in duration. In such a case, the user has intended for the disconnect switch 152 to be opened if the average power consumption over a thirty minute period exceeds 10 kW. The processing circuit 108 may also be configured to receive input indicating that the energy demand threshold is to be compared to substantially instantaneous measurements, as opposed to those accumulated over a defined demand period.

Thereafter, in step 215, the processing circuit 108 causes the demand threshold (and the defined demand period duration if applicable) to be communicated to the MC circuit 170 of the meter 150 via the communication interface 106, the optical transceivers 122, 162, and the communication circuit 158. The MC circuit 170 then stores the energy demand threshold (and the defined demand period duration) in the meter memory 159. The demand threshold control circuit 154 can thereafter then operate the disconnect switch 152 as described further above, based on the energy demand threshold and the defined demand period duration, if any.

Referring again to step 205, as discussed above, if the user selects to enter a current limit threshold instead of an energy demand threshold, then the processing circuit 108 proceeds to step 220. In step 220, the processing circuit 108 prompts for, and receives input identifying a current limit or threshold, and may further receive an input identifying the duration of the demand periods. For example, the input may indicate that the current threshold is an average of 100 amps for a "demand period", and that the demand periods are three minutes in duration. In such a case, the user has intended for the disconnect switch 152 to be opened if the average current through the lines 164 over a three minute period exceeds 100 amps. Similar to step 210, the processing circuit 108 may also be configured to receive input indicating that the current demand threshold is to be compared to substantially instantaneous measurements, as opposed to those accumulated over a defined demand period.

Thereafter, in step 225, the processing circuit 108 obtains the service voltage for the service to which the meter 150 is connected. The service voltage represents the voltage on the power lines 164. As discussed above, the service voltage is typically 240 in single phase residential meters. The processing circuit 108 may obtain the service voltage data from the user (via user interface 104), or from the MC circuit 170 itself, which typically has stored the service voltage data in the memory 159. The processing circuit 108 may also suitably obtain information from the meter memory 159 identifying the service type of the meter 150, for example, single phase or one of the polyphase types.

In step 230, the processing circuit 108 converts the user input current limit to an energy demand threshold value. As discussed, above, in one embodiment, the processing circuit 108 performs the calculation to determine the energy demand threshold value E in a single phase electrical system (i.e. residential):

$$E = A_T * V_S$$

where $A_T$ is the threshold value in units of current, representative of the user input, $V_T$ is the service voltage. The processing circuit 108 may suitably further calculate the value E in a polyphase electrical system using the following calculation:

$$E = (\sqrt{3}) * A_T * V_S$$

It will be appreciated that the square-root of three may be approximated as 1.7 or, if precision is not particularly important and/or an adjustment is necessary based on the measurement circuitry, it is conceivable that a value between 1.5 and 2.0 may be sufficient.

In any event, after step 230, the processing circuit 108 proceeds to step 235. In step 235, the processing circuit 108 causes the calculated energy demand threshold (and the defined demand period duration, if any) to be communicated to the MC circuit 170 of the meter 150 via the communication interface 106, the optical transceivers 122, 162, and the communication circuit 158. The MC circuit 170 then stores the energy demand threshold, as well as the defined demand period duration, if any, in meter memory 159. The demand threshold control circuit 154 can thereafter then operate the disconnect switch 152 as described further above, based on the energy demand threshold that corresponds to the user input current limit.

While the demand threshold control circuit 154 operates the disconnect switch 152 based on an energy or power threshold, the effective result is that the disconnect switch 152 is controlled based on energy or power limits that correspond approximately to the current limit defined by the user in step 220.

The above describe embodiments are merely exemplary. Those of ordinary skill in the art may readily devise their own implementations and modifications that incorporate the principles of the present invention and fall within the spirit and scope thereof.

I claim:

1. An arrangement comprising:
   a memory;
   a user interface arrangement configured to receive user input;
   a communication interface configured to communicate with a corresponding communication interface on a utility meter;
   a processing circuit, configured by software stored in the memory, to
   receive a user input at the user interface identifying a disconnect threshold as a measure of current;
   generate a disconnect threshold value as a function of the user input and a service voltage;
   provide the disconnect threshold value to the utility meter via the communication interface.

2. The arrangement of claim 1, wherein the communication interface includes an optical transceiver arrangement.

3. The arrangement of claim 1, wherein the processing circuit is further configured to generate the disconnect threshold value using a first relationship or a second relationship based on information identifying whether an electrical service to which the utility meter is connected is single phase service or multiphase service.

4. The arrangement of claim 3, wherein the processing circuit is configured to obtain service information identifying whether the service is a single phase service or a polyphase service, and is further configured to generate the disconnect threshold value using a first relationship when the service information indicates a single phase service and using a second relationship when the service information indicates a multiphase service.

5. The arrangement of claim 4, wherein the first relationship is W=E*A, wherein A is representative of the user input, E is representative of the service voltage, and W is representative of the disconnect threshold value.

6. The arrangement of claim 5, wherein the second relationship is W=kE*A, wherein k is a constant value greater than 1.5 and less than 2.0.

7. The arrangement of claim 4, wherein the second relationship is W=kE*A, wherein k is a constant value greater than 1.5 and less than 2.0, A is representative of the user input, E is representative of the service voltage, and W is representative of the disconnect threshold value.

8. The arrangement of claim 7, wherein k is 1.73.

9. The arrangement of claim 1, further comprising the utility meter, the utility meter configured to accept demand threshold information based on an energy threshold, the utility meter further comprising a disconnect circuit configured to disconnect electricity service to a load responsive to a measured energy calculation exceeding the energy threshold, and wherein the utility meter is configured to receive the disconnect threshold value and emply the disconnect threshold value as the energy threshold.

10. A method comprising:
 a) accepting a user input representative of a current level of a desired disconnect threshold;
 b) converting, using a processing device, the user input to a disconnect value, the converting including multiplying a value representative of the user input with a value representative of a service voltage;
 c) establishing a communication link with a utility meter via a communication port disposed on the meter;
 d) transmitting the disconnect value to the utility meter via the communication link.

11. The method of claim 1, wherein step b) further comprising converting the user input to a disconnect value using a first relationship or a second relationship based on information identifying whether an electrical service to which the utility meter is connected is single phase service or multiphase service.

12. The method of claim 11, further comprising accepting user input comprising the information.

13. The method of claim 12, further comprising accepting user input identifying a service voltage.

14. The method of claim 12, wherein the information includes service voltage information.

15. A method comprising:
 a) accepting a user input indicating a selection of a demand threshold or a current threshold;
 b) receiving a data input;
 c) storing a disconnect value comprising the data input when said user input indicates a selection of the demand threshold;
 d) when said user input indicates a selection of the current threshold, converting, using a processing device, the user input to the disconnect value, the converting including multiplying a value representative of the user input with a value representative of a service voltage;
 e) establishing a communication link with a utility meter via a communication port disposed on the meter;
 f) transmitting the disconnect value to the utility meter via the communication link.

* * * * *